(12) United States Patent
Krude

(10) Patent No.: US 6,669,570 B2
(45) Date of Patent: Dec. 30, 2003

(54) CONNECTING ASSEMBLY AT A DRIVESHAFT

(75) Inventor: Werner Krude, Neunkirchen-Seelscheid (DE)

(73) Assignee: GKN Automotive GmbH, Lohmar (DE)

( * ) Notice: Subject to any disclaimer, the term of this patent is extended or adjusted under 35 U.S.C. 154(b) by 0 days.

(21) Appl. No.: 10/165,354

(22) Filed: Jun. 7, 2002

(65) Prior Publication Data
US 2002/0187843 A1 Dec. 12, 2002

(30) Foreign Application Priority Data
Jun. 7, 2001 (DE) .......................... 101 27 458

(51) Int. Cl.⁷ .............................................. B60B 27/06
(52) U.S. Cl. ........................ 464/157; 403/340; 403/364
(58) Field of Search ................... 403/339, 340, 403/345, 359.1, 364, 380; 464/137, 157, 901; D21/479

(56) References Cited

U.S. PATENT DOCUMENTS

| | | | | |
|---|---|---|---|---|
| 1,263,252 A | * | 4/1918 | Jencick | 464/157 |
| 3,191,453 A | * | 6/1965 | Hoven | 74/432 |
| 5,021,001 A | * | 6/1991 | Ramirez | 439/349 |
| 6,413,008 B1 | * | 7/2002 | van Dest et al. | 403/359.1 |

FOREIGN PATENT DOCUMENTS

| | | |
|---|---|---|
| CH | 615 984 A | 2/1980 |
| DE | 197 51 855 C1 | 4/1999 |
| DE | 199 58 674 A1 | 6/2001 |

* cited by examiner

Primary Examiner—Lynne H. Browne
Assistant Examiner—Kenn Thompson

(57) ABSTRACT

A connecting assembly for a driveshaft, includes an end toothing at a first component and an end toothing at a second component, wherein the end toothings have teeth and gaps. In an end view, the image of the teeth and gaps at both components, are identical and wherein, starting from corresponding images of the teeth and gaps at both components, there are obtained matching complementary images of the teeth and gaps at the two components in an end view when the components are rotated relative to one another by 90° or 180°.

18 Claims, 10 Drawing Sheets

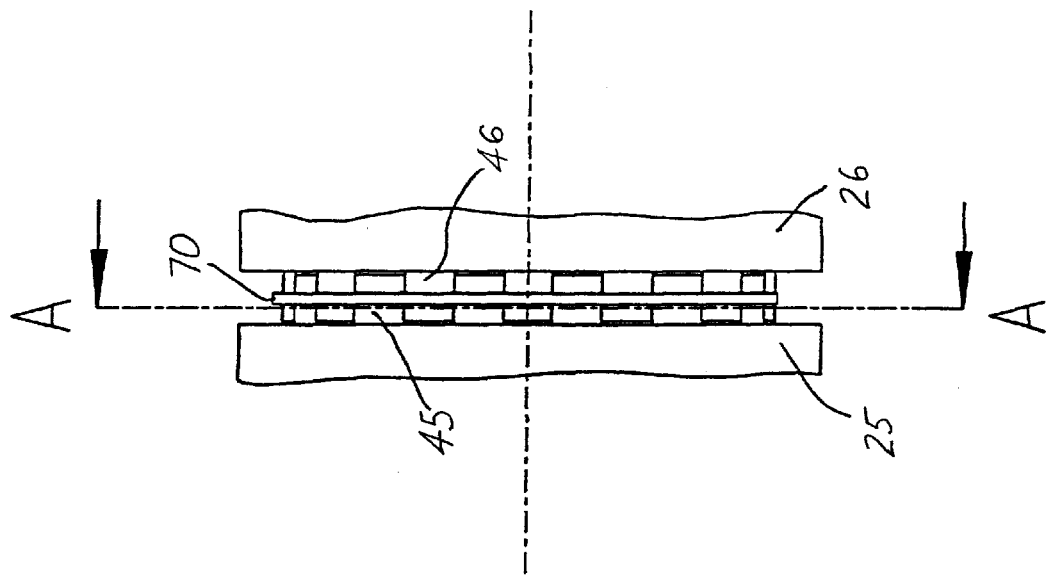
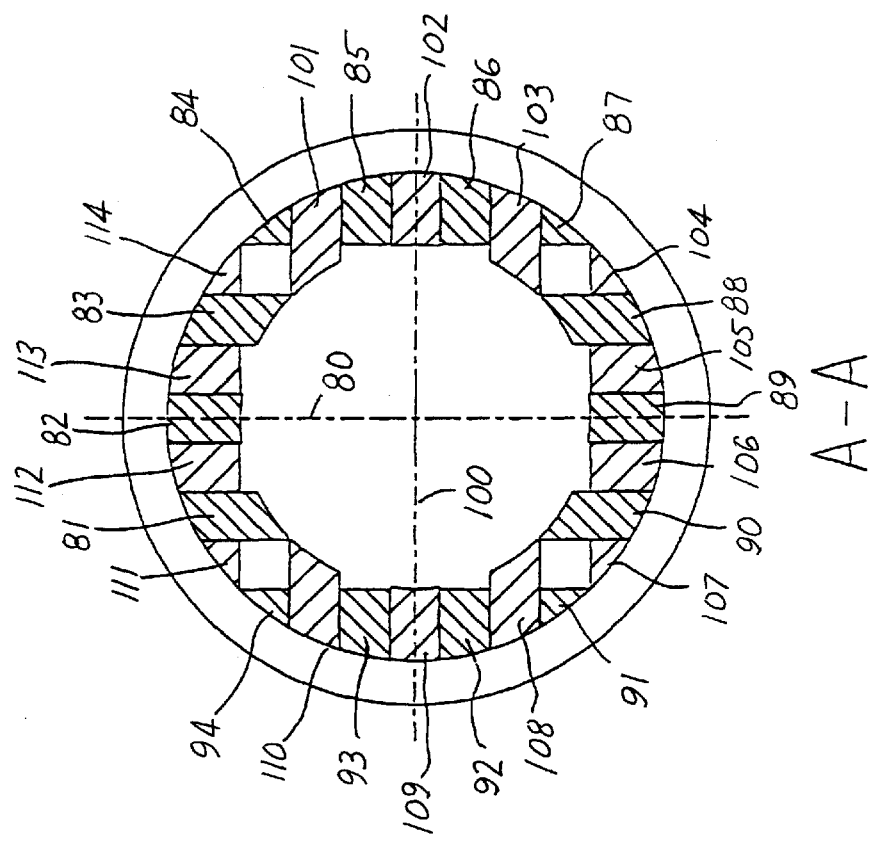

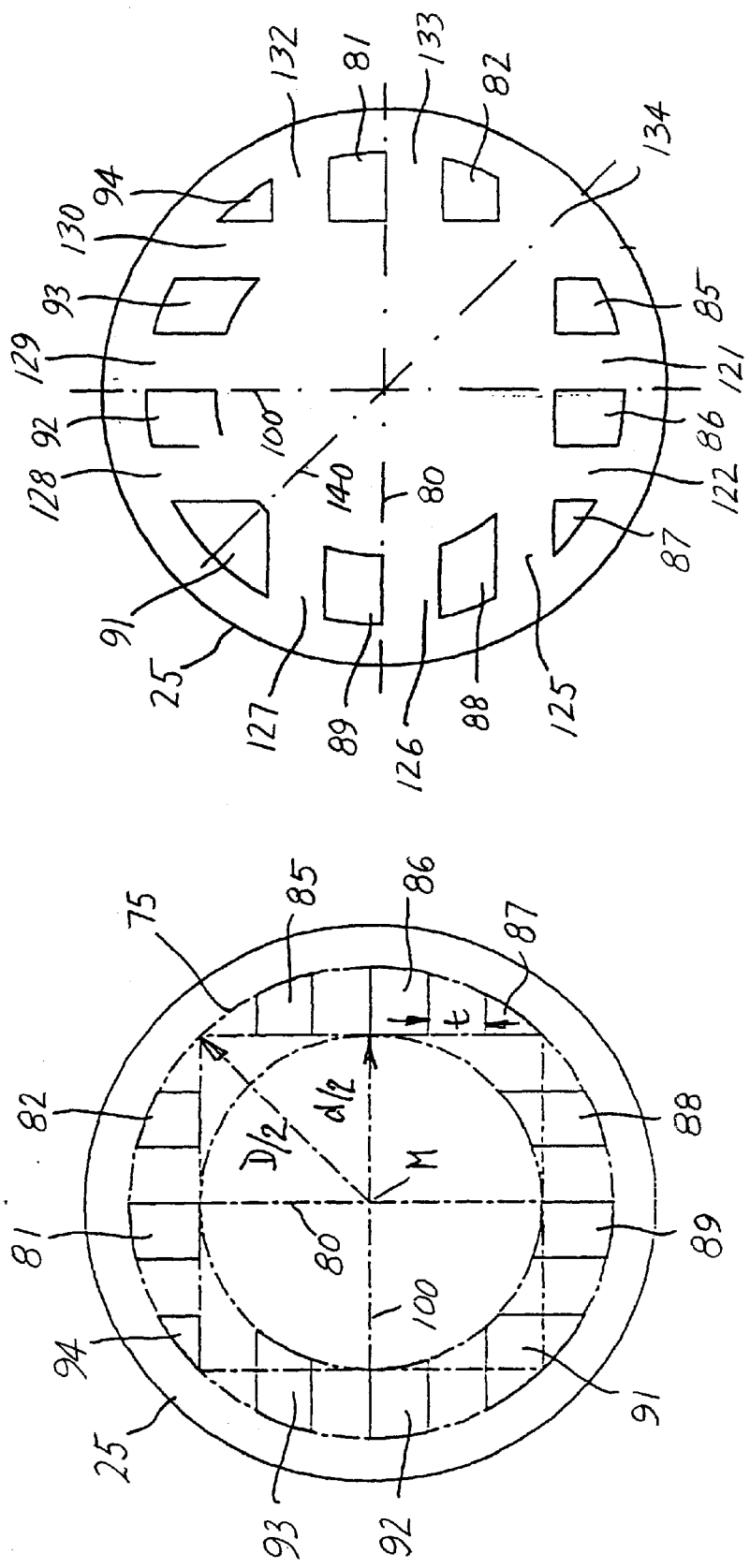

CONNECTING ASSEMBLY AT A DRIVESHAFT

TECHNICAL FIELD

The present invention relates to connecting assemblies between two components, at a driveshaft. In particular, the invention concerns a connecting assembly between an outer joint part of a constant velocity joint of a driveshaft and a wheel hub or a shaft flange in the driveline of a motor vehicle.

BACKGROUND OF THE INVENTION

From DE 197 51 855 C1 there is known a connecting assembly of a first type having an end toothing at an outer joint part at the wheel hub end of a constant velocity joint of the driveshaft, and having an end toothing at the wheel hub. The end toothings are axially inserted into one another and engage one another in a clearance-free way in the circumferential direction. Also, the teeth of the end toothings each include radially outwardly opening circumferential grooves which are delimited by two flanks and which, together, form a circumferentially extending annular groove. The annular groove, on the outside, is engaged by a securing ring. At the wheel hub and at the outer joint part there are also formed concentric annular cylindrical projections with approximately identical diameters. From this reference, there is also known a connecting assembly of a second type having an end toothing at an outer joint part at a shaft flange end of a driveshaft, and having an end toothing at the shaft flange. The end toothings are axially inserted into one another and engage one another in a clearance-free way in the circumferential direction. Also, the teeth of the end toothings are provided with radially outwardly opening circumferential grooves which are delimited by two flanks and which, together, form a circumferentially extending annular groove. The annular groove, on the outside, is engaged by a securing ring. At the shaft flange and at the outer joint part there are also formed concentric annular cylindrical projections with approximately identical diameters. These assemblies meet all the requirements regarding a clearance-free connection which can easily be assembled, but the end toothings cannot easily be produced in the required quality.

U.S. Pat. No. 967,395 proposes a claw coupling between two rotating hollow shafts. The individual claws include inner grooves which, in the engaged condition, form a continuous groove in whose inside there is positioned a retaining ring. This type of coupling is not suitable for connecting annular parts with intermediate walls or inserts because it is necessary to ensure access for fitting the retaining ring through the inside of the hollow shafts.

DE 8136172 U1 proposes a coupling for rigidly connecting coaxial components in the case of driveshafts. The components to be connected are provided with end toothings which are inserted into one another. For the purpose of being axially secured, the components to be connected are provided with a backwardly extending shaft step which is arranged behind the end toothing. In the engaged condition of the end toothings, pieces with a U-profile in the form of circular segments are placed on to the circumference of the shaft steps. To prevent the U-profile pieces from being released, they have to be joined to form a ring, or they have to be secured by a slid-on ring, or they have to be clamped relative to one another by wedges. This results in very complicated assembly procedures.

From DE 196 45 880 A1, there is known a connecting assembly between an outer joint part of a constant velocity joint and the shaft flange of a driveshaft wherein, for the purpose of transmitting torque, the two parts, in the direction of rotation, engage one another in a clearance-free way via inter-engaging claw toothings. At the outer joint part, the front ends of the claws form an assembled planar end face which is supported against an assembled planar end face at the shaft flange between the base regions of the claws. At the ends of the claws of the two parts there are provided outwardly pointing pawls. At each of the parts, the pawls form an assembled annular collar with a backwardly pointing conical inclined face. To ensure that the abutting planar end faces of the two parts are axially clamped together in a clearance-free way, a securing ring is inserted between the annular collars composed of the pawls, which securing ring rests on the conical inclined faces. In addition to the inclined faces and the flank faces of the teeth of the claw toothings, it is necessary for the planar end faces to be machined accurately to achieve a clearance-free, torque transmitting connection.

From DE 27 15 639 B1 and DE 25 54 574 A1 there are known flange connection assemblies at shaft parts of universal joints, which assemblies, at two annular flange parts, each include two groups of parallel grooves. The groups are aligned at an angle relative to one another. The grooves are provided in a larger number of the type of precision toothings.

Connecting assemblies of the foregoing type are also described in the earlier unpublished application DE 199 58 674.8 and have an end toothing at a first component and an end toothing at a further component, wherein the end toothings include teeth and gaps which are axially inserted into one another and, in the circumferential direction, engage one another in a clearance-free way. The teeth of the end toothings, at the outer circumference, include outwardly opening circumferential grooves which are delimited by two flanks and which, when the end toothings are inserted into one another, form a circumferentially extending annular groove. The annular groove, on the outside, contains a securing ring. The teeth at the two components, i.e. at the first component and at the further component, are arranged within an imaginary cylindrical annular space. The gaps, in pairs, are positioned in two groups of continuous imaginary groove tracks which are arranged at a right angle relative to one another and which twice pass through the respective cylindrical annular space.

Accordingly, there is a need for a connecting assembly between an outer joint part of a constant velocity joint of a driveshaft and another part, having improved manufacturability.

SUMMARY OF THE INVENTION

It is an object of the present invention to provide a connecting assembly between an outer joint part of a constant velocity joint of a driveshaft and a further component, for example a wheel hub or a shaft flange, which can be provided more easily and cost-effectively than conventional connecting assemblies.

An improved connecting assembly is provided wherein, in an end view, the images of the teeth and gaps are the same at both components, i.e. at the outer joint part and the further component. In addition, starting from the corresponding images of the teeth and gaps at both components, matching complementary images of the teeth and gaps at the two components result when the components are rotated relative to one another by 90° or 180°.

A further solution is provided wherein, at the cylindrical annular space, the ratio of the inner diameter (d) to the outer diameter (D) is defined by: $d\sqrt{2} \geq \geq D$, wherein, when the number (z) of teeth and gaps, the width (t) of the teeth and of the gaps is given by: $t=\sqrt{2}(D/2z)$.

According to another solution, in an axial view, the image of the teeth and gaps comprises a first axis of symmetry which extends through the central axis of the cylindrical space and intersects two teeth positioned opposite one another in pairs. A second axis of symmetry extends perpendicularly relative to the first axis of symmetry through the central axis and intersects two gaps positioned opposite one another in pairs.

According to yet a further solution, in an axial view, the image of the teeth and gaps comprises a first axis of symmetry which extends through the central axis of the cylindrical space. On the first axis of symmetry, at least two teeth positioned opposite one another can be mirrored on two identically shaped gaps positioned opposite one another. A second axis of symmetry extends perpendicularly relative to the first axis of symmetry through the central plane. On the second axis of symmetry, at least two teeth positioned opposite one another can be mirrored on two identically shaped gaps positioned opposite one another. A third axis of symmetry extends through a tooth and a gap positioned radially opposite one another, and halves the angle between the first and the second axis of symmetry. On the third axis of symmetry, teeth can be mirrored on identically shaped teeth, and gaps can be mirrored on identically shaped gaps.

The above arrangements result in advantageous, corresponding embodiments of the toothing elements at both components, which simplify production.

According to a first embodiment, the gaps in each of the annular cylinders are formed by a group of three or five groove tracks and another group of two or four groove tracks. Corner teeth in the form of four angle pieces are offset relative to the bisectrix in such a way that they do not obstruct the toothing engagement. This results in toothing geometries permitting relatively straight-forward machining operations.

The toothings are preferably produced by using a broaching tool moving transversely to the longitudinal axis of the annular cylinders for forming the groove tracks, which form the toothing gaps, into the originally solid annular cylinders. For each annular cylinder, two different broaching tools are used, with the workpiece being re-clamped once. In particular, it is rotated by 90° around its axis. The imaginary groove tracks corresponding to the travel of the broaching tools and, thus, the gaps are symmetrical relative to two radial planes which extend through the longitudinal axis and are positioned perpendicularly relative to one another.

The first broaching tool may include an uneven number of three or five parallel broaching needles clamped relative to one another, whereas the second broaching tool can include a corresponding even number of four or six parallel broaching needles which are supported relative to one another or clamped relative to one another. The latter are positioned in such a way that in the region of the bisectrix between the two radial reference planes, two rectangularly delimited angle pieces are produced at the components by broaching in two directions extending perpendicularly relative to one another, which two angle pieces do not obstruct one another during assembly.

According to a second embodiment, the gaps in each of the annular cylinders are formed by a group of three or five groove tracks. Two corner teeth, each in the form of angle pieces, are offset relative to one of the bisectrices in such a way that they do not obstruct the engagement of the toothings. A corner gap is diametrically opposed to a further corner tooth on the other one of the bisectrices, so that a suitable tooth engagement takes place when the components are rotated relative to one another by 180°.

Again, the toothings are produced by using a broaching tool moving transversely to the longitudinal axis for forming the groove tracks, which form the toothing gaps, into the annular cylinders. One single broaching tool is sufficient for producing all of the groove tracks in the two components. The imaginary groove tracks corresponding to the travel of the broaching tools and thus the gaps are asymmetrical relative to two radial planes which extend through the longitudinal axis, and are positioned perpendicularly relative to one another.

The broaching tool can include three or five broaching needles which are clamped relative to one another. With this method of production, too, three corner pieces and the one corner gap are produced entirely by broaching the continuous groove tracks in the annular cylinders.

The inventive connecting assemblies are advantageous in that they can be assembled quickly and easily. As a result of the very short displacement paths when inserting the end toothings into one another, driveshafts can be fitted and removed very easily between the wheel hub and shaft flange of a differential drive, especially in a complete vehicle with a finish-assembled wheel suspension system. This is advantageous for both the initial assembly procedures and for subsequent repairs. Furthermore, the connecting assemblies are characterised by a small number of parts and a low weight. The circumferential grooves for the connecting securing ring can either be formed on each of the parts individually or, in the case of inter-engaging end toothings, on both parts simultaneously.

Any torque which has to be transmitted by the driveshaft will be accommodated by the inter-engaging end toothings of the connecting assembly. Any rotating bending moments at the connecting assembly, which originate from the constant velocity joint rotating in an articulated condition, primarily act on the securing ring positioned in the annular groove. In each circumferential groove, one flank of the securing ring is subjected to load, with the load being removed from the other flank. As far as circumferentially directly adjoining circumferential grooves are concerned which are each associated with a different tooth and thus with another one of the two end toothings, it is the flanks pointing in opposite directions which are loaded by the securing ring.

According to a first advantageous design, the toothing elements of the two end toothings comprise flanks which extend parallel to the radial planes. This results in a simple geometry that is easy to produce.

As a result of the axial displaceability of such end toothings, the securing ring and the circumferential grooves are designed in such a way that the former, by means of both flanks, is supported on the latter in a clearance-free way in order to be able to accommodate axial forces in both directions without there occurring any axial displacements when the direction of load application changes.

According to a further advantageous design, the toothing elements of the two end toothings comprise flanks which enclose an angle with the radial planes, with the angles of the flanks at the two end toothings opening in opposite directions and being of identical size. The teeth of the two end toothings are thus wedge-shaped and can be inserted into one another in a clearance-free way. The wide tooth bases provide an increase in strength and ensure a uniform load distribution in the teeth.

In the case of such end toothings with teeth whose flanks enclose an angle, axial support of the parts is secured in one direction (pressure). Thus, the securing ring and the circumferential grooves can be designed in such a way that clearance-free contact of the securing ring at the flanks of the grooves takes place in the opposite direction only (tension). The circumferential grooves of the one end toothing can be offset relative to the circumferential grooves of the other end toothing in such a way that there is formed an annular groove extending to and fro. This results in the flanks of the securing ring only coming into contact with those flanks of the circumferential grooves which face the respective other end toothing. A first embodiment, at the outside of the end toothings, comprises circumferential grooves with parallel flanks, with the securing ring comprising corresponding parallel flanks. The circumferential grooves are easy to produce, and it is possible to use standard securing rings.

According to a different embodiment, the flanks of the circumferential grooves, on the outside of the two end toothings, enclose an angle relative to an imaginary axis-normal radial plane, which angle opens radially outwardly. The securing ring comprises corresponding flanks which enclose the same angle relative to an imaginary axis-normal radial plane. In the inserted condition of the end toothings, the circumferential grooves thus form a wedge-shaped groove which receives a securing ring with a wedge-shaped profile. The securing ring, as a result of its radial tensioning force, is pressed into the wedge-shaped groove, with axial force components occurring due to the wedge shape of the securing ring.

As a result of the interplay with a wedge shape of the end toothings, and due to the wedge-shaped profile of the securing ring and of the circumferential grooves, which form an annular groove extending to and fro, it is possible to generate an axial force component which, in the final analysis, presses the two end toothings into one another. In this way, it is possible to avoid any axial play and also any circumferential play in the connecting assembly.

Preferred embodiments of the invention are illustrated in the drawings and will be described below. Other advantages and features of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 5 is a radial view of an inventive connecting assembly in a first embodiment whose tooth flanks extend parallel relative to one another in the axial direction.

FIG. 6 shows a section through the toothing according to FIG. 5 along line A—A.

FIG. 11 shows the production of an end toothing according to FIGS. 9 and 10.

FIG. 12 shows the result of a production process according to FIG. 11 with an end view of the inventive end toothing.

DETAILED DESCRIPTION OF THE INVENTION

Figure 1:
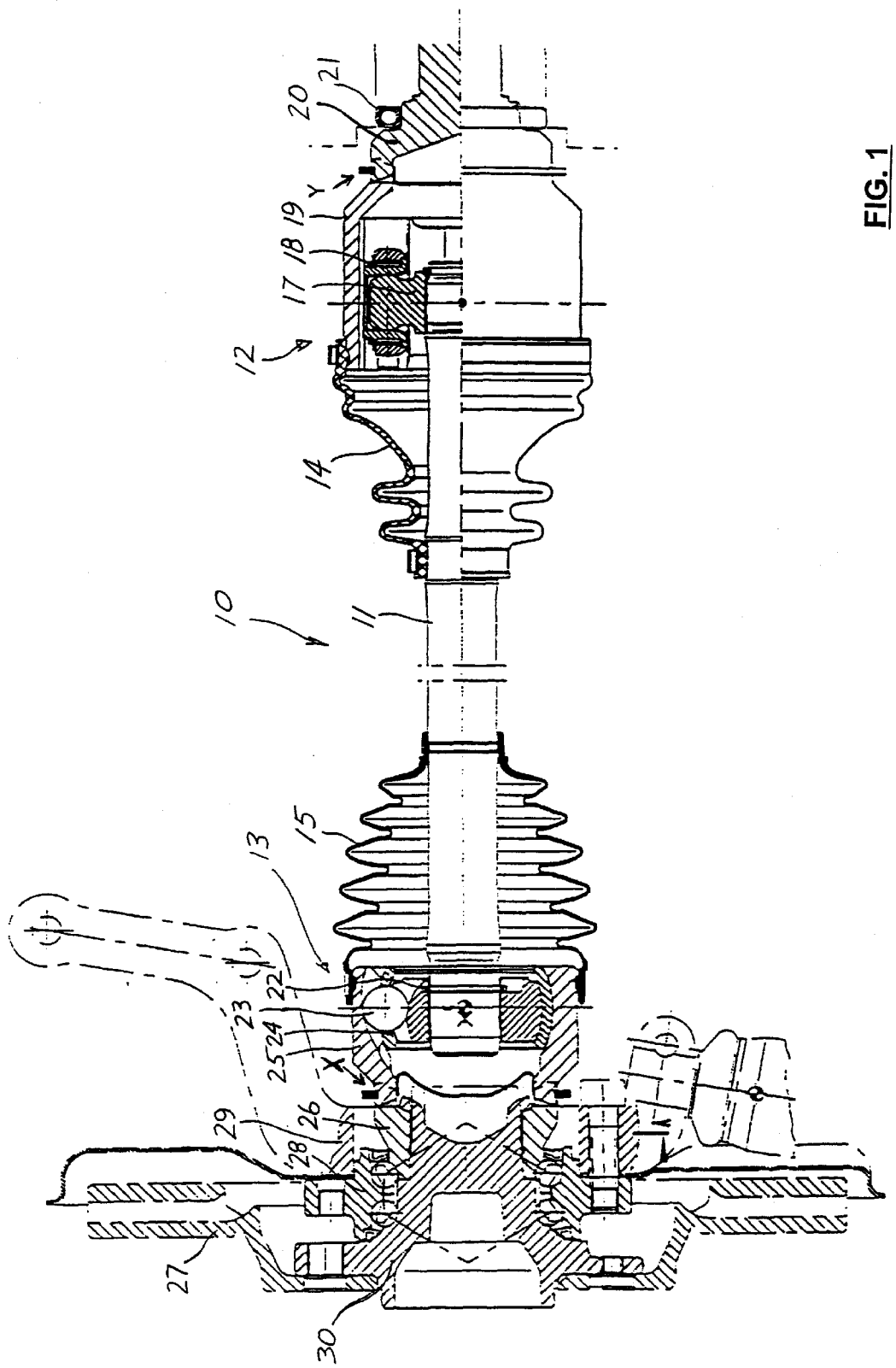
FIG. 1 is a longitudinal section through a driveshaft between a differential drive flange and a wheel hub with two inventive connecting assemblies.

FIG. 1 shows a driveshaft 10, as mounted in a vehicle, in the form of a sideshaft at a steered wheel between a shaft flange 20 of a differential drive and a wheel hub 30. At the differential drive end, the driveshaft 10 comprises a tripode joint 12 and, at the wheel hub end, a constant velocity fixed ball joint 13. The joints 12, 13 are connected to one another by a shaft 11. A convoluted boot 14 seals the tripode joint 12 relative to the shaft 11, and a convoluted boot 15 seals the constant velocity fixed ball joint 13 relative to the shaft 11.

The tripode joint 12 substantially comprises an inner joint part 17, roller elements 18 and an outer joint part 19. A connecting assembly provides the connection between the outer joint part 19 and the shaft journal 20 of the differential drive. The shaft journal 20 is supported in a roller bearing 21 in the differential drive, with the contour of the roller bearing 21 being indicated in dashed lines only.

The constant velocity fixed joint 13 substantially comprises of an inner joint part 22, torque transmitting balls 23, a ball cage 24 and an outer joint part 25. Via a connecting assembly, the outer joint part 25 is directly connected to an annular component 26 which is form-fittingly and positively secured on the wheel hub 30 and can be regarded as part of same. A brake disc 27 is bolted to the wheel hub 30 which is supported in a wheel carrier 29 by means of a double-row ball bearing 28. A first inventive connecting assembly referred to by "X" in the form of a detail comprises the outer joint part 25 and the further component 26; it will be described in greater detail below. A second inventive connecting assembly referred to by "Y" is formed by the outer joint part 19 and the shaft flange 20 and has the same characteristics as the first one.

Figure 2:
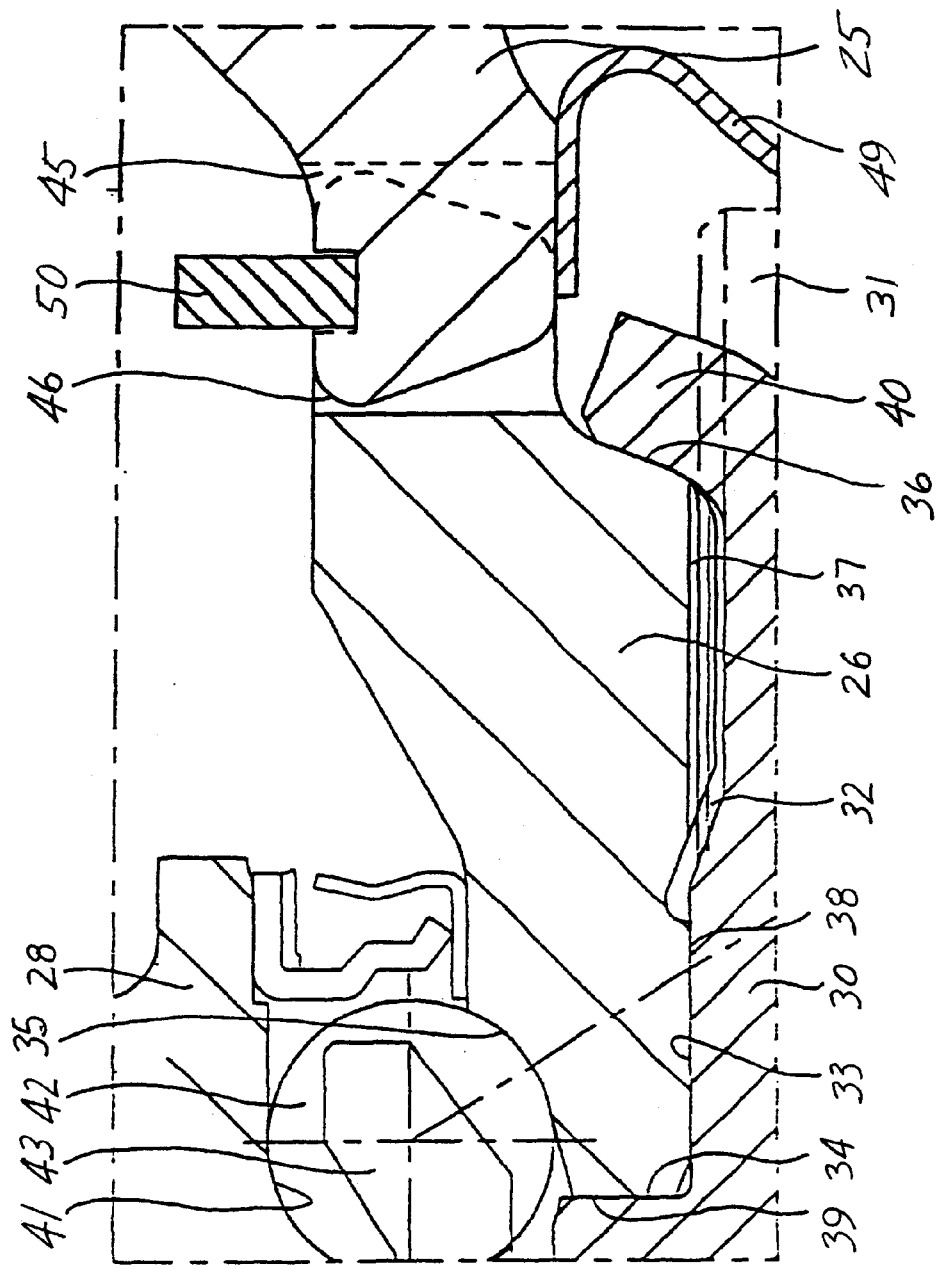
FIG. 2 is a longitudinal section through an inventive connecting assembly between an outer joint part (at the wheel hub end) of a constant velocity joint of a driveshaft and a wheel hub according to FIG. 1 in an enlarged illustration.

In FIG. 2, all the parts of the constant velocity fixed joint 13 and of the wheel hub 30 according to FIG. 1 are shown in an enlarged scale. The constant velocity fixed joint is closed by a cover 49. As indicated by dashed lines, the wheel hub 30, prior to the mounting of the bearing, is provided with a sleeve-shaped projection 31 which comprises an outer toothing 32. Behind the latter, there is provided a cylindrical centring face 33 which is delimited by a radial stop face 34. The component 26 which forms a bearing groove 35, on its inside, comprises a supporting face 36, an inner toothing 37 engaging the outer toothing 32, a seat face 38 positioned on the centring face 33, as well as an end face 39 resting against the stop face 34. After the component 26 has been slid on to the hub 30, the projection 31 is widened, so that it rests in the form of a collar 40 against the supporting face 36.

This measure, at the same time, complements and sets the ball bearing 28 of which an outer bearing groove 41 and a bearing ball 42 as well as a bearing cage 43 can be seen. It can also be seen that the outer joint part 25 and the component 26 are provided with annular cylindrical projections with inter-engaging end toothings 45, 46 retained by a securing ring 50.

Figure 3:
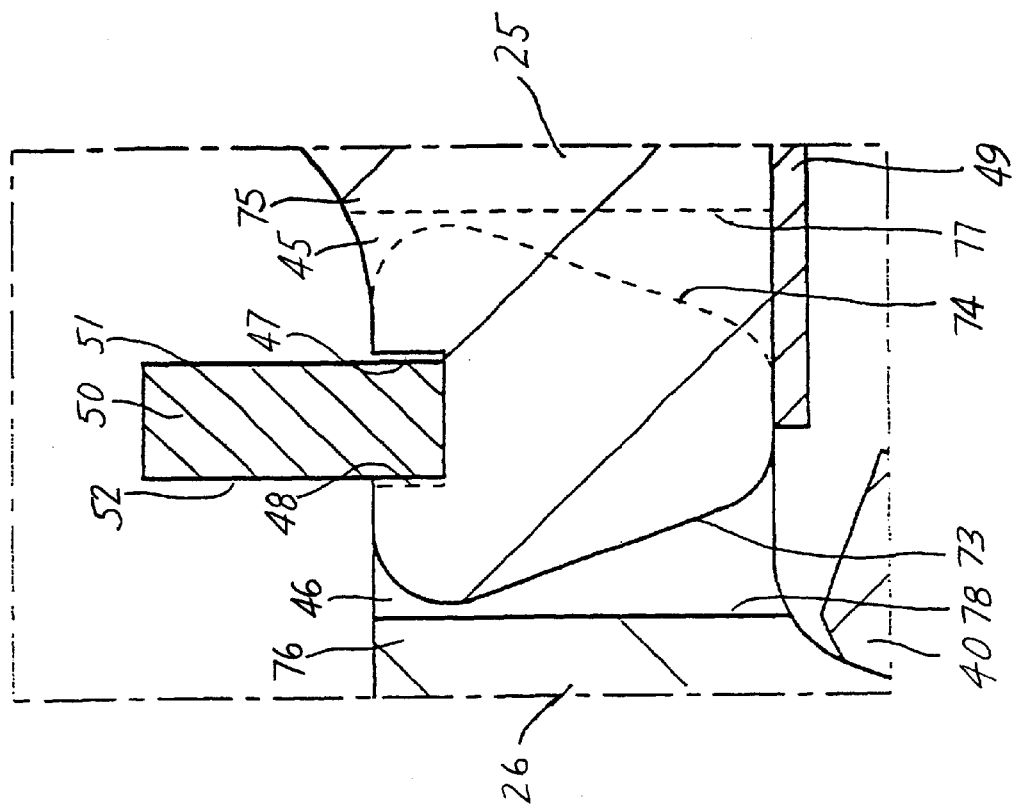
FIG. 3 is a detail X of FIG. 1 in an enlarged illustration.

FIG. 3 shows the detail X in the form of the connecting assembly in an even larger scale. The toothings 45, 46 are provided in annular cylinders 75, 76 at the outer joint part 25 and at the component 26 respectively. The end faces at the front are formed by portions of inner conical faces 73, 74. The bases of the toothings are formed by parts of radial faces 77, 78.

On the outer circumference of the end toothings 45, 46, there are formed circumferential grooves 47, 48 which complement each other to form a substantially closed annular groove which contains a securing ring 50. The side flanks 51, 52 of the securing ring 50 extend parallel relative to one another and are positioned in normal planes with reference to the longitudinal axis of the parts to be connected. The flanks of the circumferential grooves 47, 48, are aligned accordingly and thus form rectangular grooves. The toothings 45, 46 are designed in such a way that, with clearance-free contact of the tooth flanks in the circumferential direction, they are axially displaceable relative to one another. Therefore, the securing ring 50 has to engage both circumferential grooves 47, 48 in a substantially clearance-free way. An assembly play in the range of approximately ¹⁄₁₀ mm is permissible.

Figure 4:
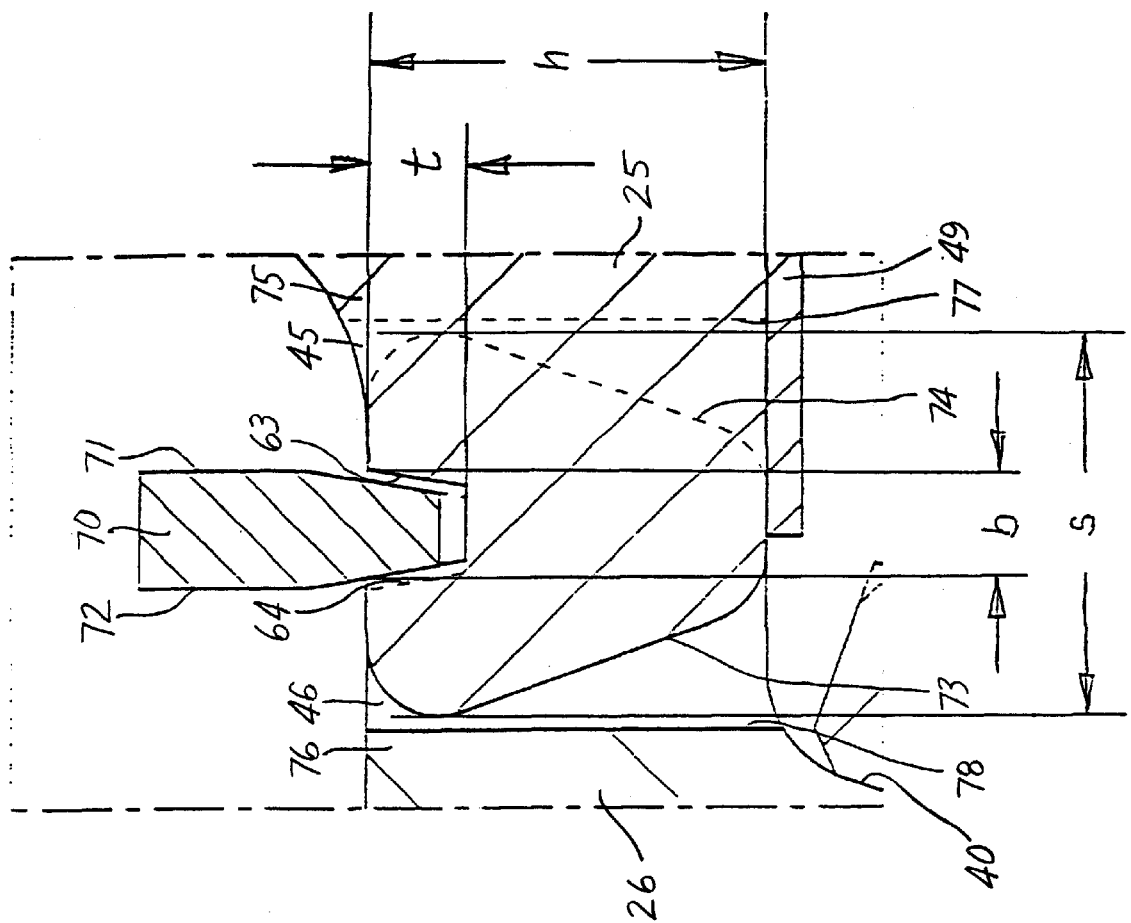
FIG. 4 shows the detail X of FIG. 1 in an embodiment which is modified relative to FIG. 3.

FIG. 4 shows a modified version of the detail X according to FIG. 1 in an enlarged scale. The outer joint part 25 is provided with an end toothing 45 and the component 26 with an end toothing 46. The toothings 45, 46 are formed on annular cylinders 75, 76 at the outer joint part 25 and at the component 26 respectively. The end faces at the front are formed by portions of inner conical faces 73, 74. The bases of the toothings are formed by parts of radial faces 77, 78.

On the outside of the end toothings there are formed circumferential grooves 63, 64 which comprise identical widths, but are axially offset relative to one another. In the circumferential grooves there is arranged a securing ring 70. In the region of its engagement with the circumferential grooves 63, 64, the securing ring 70 comprises outwardly opening flanks 71, 72 which form an angle relative to one another. The alignment of the respective flanks of the circumferential grooves substantially corresponds to that of the flanks of the securing ring 70. The circumferential grooves 63, 64 are axially offset relative to another by a small amount and thus form an annular groove which extends to and fro. In the case of the type of connecting assemblies with axially offset circumferential grooves it has to be assumed that if the toothings 45, 46 are in play-free contact, they simultaneously axially support one another in respect of pressure. A securing ring 70 inserted in this position, by means of its flank 72, then, under compressive pre-tension, rests against the right-hand flank of the circumferential groove in the end toothing 45 and, by means of its flank 71, against the left-hand flank of the circumferential groove 64 in the end toothing 46. An amount of play which is greater than the assembly play is permissible relative to the respective other flank of the circumferential groove. The wedge-shaped securing ring 70 can be inserted with radial pre-tension. The radial insertion of the ring into the circumferential grooves generates an axial compressive pre-tension between the end toothings. The depth of the circumferential grooves 63, 64 has been given the reference symbol t and the width of the circumferential grooves the reference symbol b. The radial height of the toothing engagement is referred to by h and the depth of engagement of the toothings by s.

FIG. 5 shows two inventive components 25, 26 with inter-engaging end toothings 45, 46. In a radial view, the end toothings comprise axis-parallel flanks. The end faces of the end toothings 45, 46 are arranged at a small axial distance from the other component of the connection. A securing ring 70 is inserted into the circumferential grooves (not shown in detail).

The details of the shape of the toothing can be seen in FIG. 6. The component 25 comprises two groups of teeth 85, 86, 92, 93 arranged opposite one another in pairs and having flanks which are positioned horizontally in the drawing; three groups of teeth 81, 82, 83, 88, 89, 90 arranged opposite one another in pairs and having flanks which are positioned vertically in the drawing; as well as four corner teeth 84, 87, 91, 94. Accordingly, the second component 26 comprises two teeth each 105, 106, 112, 113 positioned opposite one another and having vertically extending flanks; three teeth each 101, 102, 103, 108, 109, 110 with flanks which extend horizontally in the drawing; as well as corner teeth 104, 107, 111, 114. It can be seen that the respective corner teeth of the two components 25, 26 do not interfere with one another and that the teeth in each of the components 25, 26 are positioned within an annular cylindrical space and that the gaps are provided by two groups of parallel groove tracks which pass twice through an originally fully cylindrical annular member. The teeth and gaps are arranged symmetrically to one another relative to radial planes 80, 100 positioned perpendicularly relative to one another.

Figure 7:
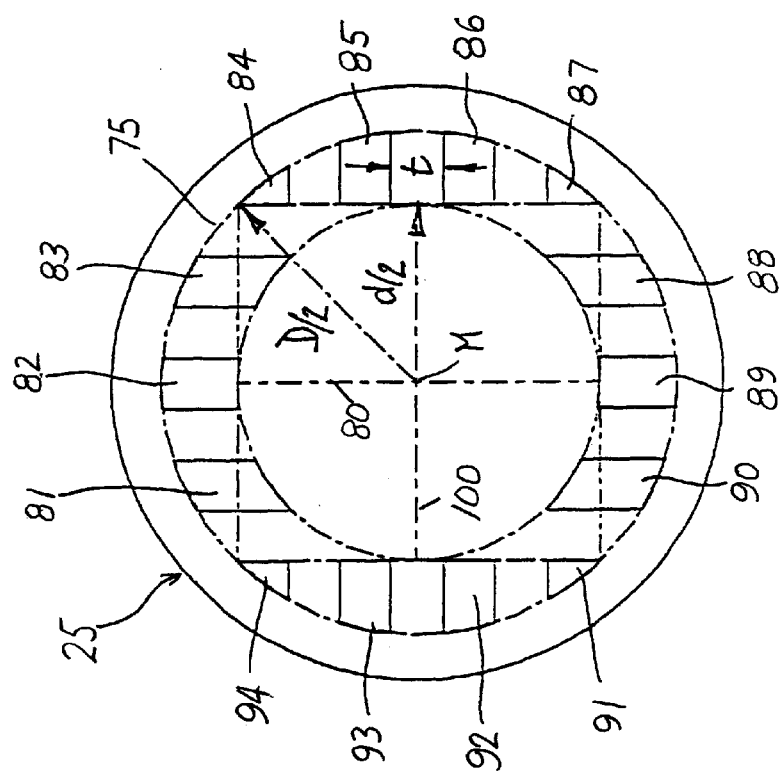
FIG. 7 shows the production of an end toothing according to FIGS. 5 and 6.

FIG. 7 shows how at the component 25, from an initially solid annular cylinder 75 with the inner radius d/2 and the outer radius D/2, the image of the previously described teeth 81–94 is produced by broaching four continuous vertical groove tracks and three continuous horizontal groove tracks. The letter t refers to the width of the gaps (not identified by numerals) which are arranged in pairs within the imaginary groove tracks. Reference M is the central axis of the imaginary annular cylindrical space within which there are positioned teeth and gaps.

Figure 8:
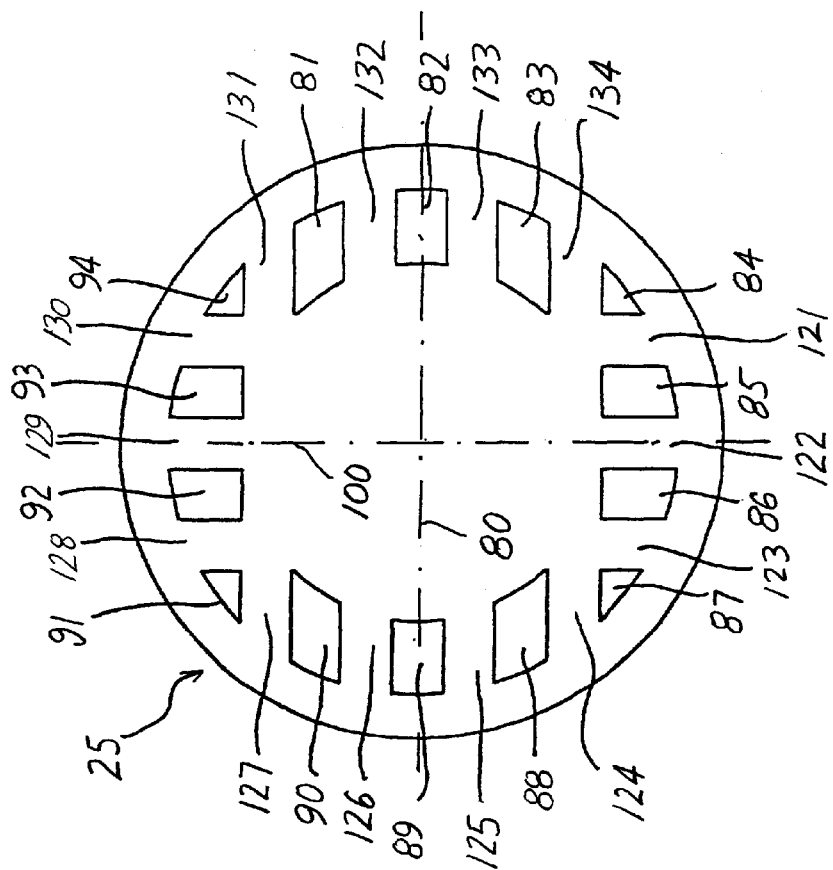
FIG. 8 shows the result of the production process according to FIG. 7 with an end view of the inventive end toothing.

FIG. 8 shows the end result of the operation according to FIG. 7 in a position rotated by 90°. This illustration can also be interpreted as part 26 in a position which matches part 25 according to FIG. 7. Between the teeth 81–84, there are provided gaps 121–134. The groove tracks have cleared the annular cylinder as far as the end face of the component and form pairs of opposed gaps between the teeth. The first axis of symmetry 80 extends through two teeth 82, 89 positioned opposite one another in pairs and the second axis of symmetry 100 extends through two gaps 122, 129 positioned opposite one another in pairs.

Figure 9:
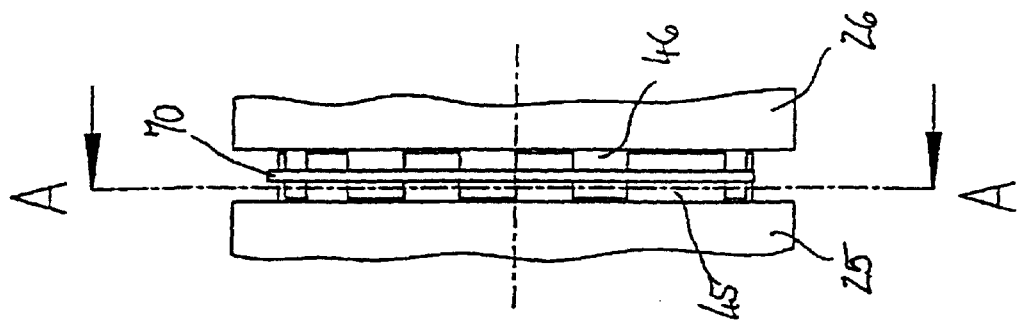
FIG. 9 is a radial view of an inventive connecting assembly in a second embodiment with tooth flanks which, in the axial direction, extend parallel relative to one another.

FIG. 9 shows two inventive components 25, 26 with inter-engaging end toothings 45, 46. In a radial view, the end toothings comprise axis-parallel flanks. The end faces of the end toothings 45, 46 are arranged at a short axial distance from the other component of the connection. A securing ring 70 is inserted into the circumferential grooves (not shown in detail).

Figure 10:
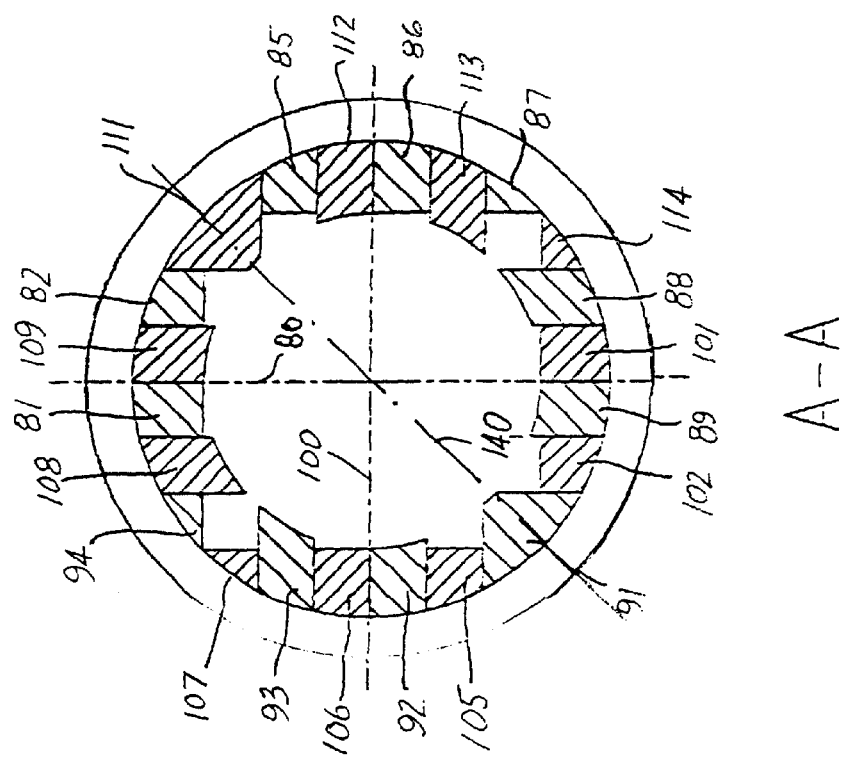
FIG. 10 shows a section through the toothing according to FIG. 9 along line A—A.

The details of the shape of the toothing can be seen in FIG. 10. The component 25 comprises two groups of teeth 81, 82, 88, 89 arranged opposite one another in pairs and having flanks which are positioned vertically in the drawing.

Two groups of teeth 85, 86, 92, 93 are arranged opposite one another in pairs and having flanks which are positioned horizontally in the drawing. Three corner teeth 87, 91, 94 are also shown. Accordingly, the second component 26 comprises two groups of teeth 101, 102, 108, 109 positioned opposite one another in pairs and having vertically extending flanks. Two groups of teeth 105, 106, 112, 113 are positioned opposite one another in pairs and have flanks which extend horizontally in the drawing. The second component also includes corner teeth 107, 111, 114. It can be seen that there are only three corner teeth which do not interfere with one another and that the teeth in each of the components 25, 26 are provided by two groups of parallel groove tracks which pass twice through an originally fully cylindrical annular member. The groove tracks are arranged asymmetrically relative to one another in radial planes 80, 100 positioned perpendicularly relative to one another. As a result, there is obtained an image of teeth and gaps which is symmetric relative to only one bisectrix 140 between the planes 80, 100. However, the planes of symmetry 80, 100 mirror teeth on identically shaped gaps and gaps on identically shaped teeth. The matching engagement of the toothings of the components 25, 26 is thus possible in a position rotated by 180°, starting from a corresponding image of teeth and gaps.

FIG. 11 shows how, at the component 25, from an initially solid annular cylinder 75 with the inner radius d/2 and the outer radius D/2, the image of the previously described teeth 81, 82, 85, 86, 87, 88, 89, 91, 99, 93, 94 is produced by broaching three continuous vertical groove tracks and three continuous horizontal groove tracks. Reference t refers to the width of the gaps (not identified by numerals) which are arranged in pairs within the imaginary groove tracks. Reference M is the central axis of the imaginary annular cylindrical space within which there are positioned teeth and gaps.

FIG. 12 shows the end result of the operation according to FIG. 11 in a position rotated by 90°. Between the teeth 81–94, there are provided gaps 121, 122, 125, 126, 127, 128, 129, 130, 132, 133, 134. The groove tracks have cleared the annular cylinder as far as the end face of the component 25 and form pairs of opposed gaps between the teeth. The first axis of symmetry 80 mirrors the teeth 81, 89 on the identically shaped gaps 133, 126 and the gaps 132, 127 on the identically shaped teeth 82, 88. The second axis of symmetry 100 mirrors the teeth 92, 86 on the identically shaped gaps 129, 121 and the gaps 128, 122 on the identically shaped teeth 93, 95. The teeth and gaps are symmetric relative to the angle-bisecting axis of symmetry 140 extending through the corner tooth 91 and the corner gap 134.

Figure 13:
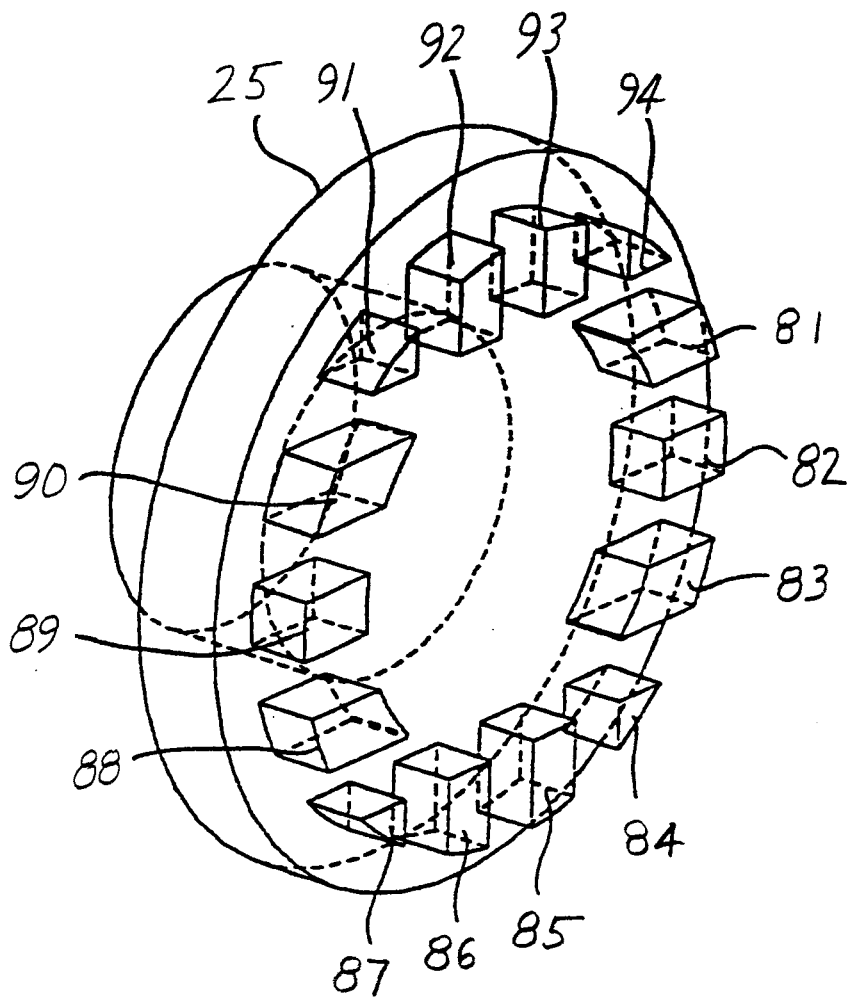
FIG. 13 shows an end toothing according to FIGS. 5 and 6 in an inclined view.

FIG. 13 shows the component 25 according to FIG. 8 in a perspective view, with the same reference numbers being used. To that extent, reference is made to the description of FIG. 8.

Figure 14:
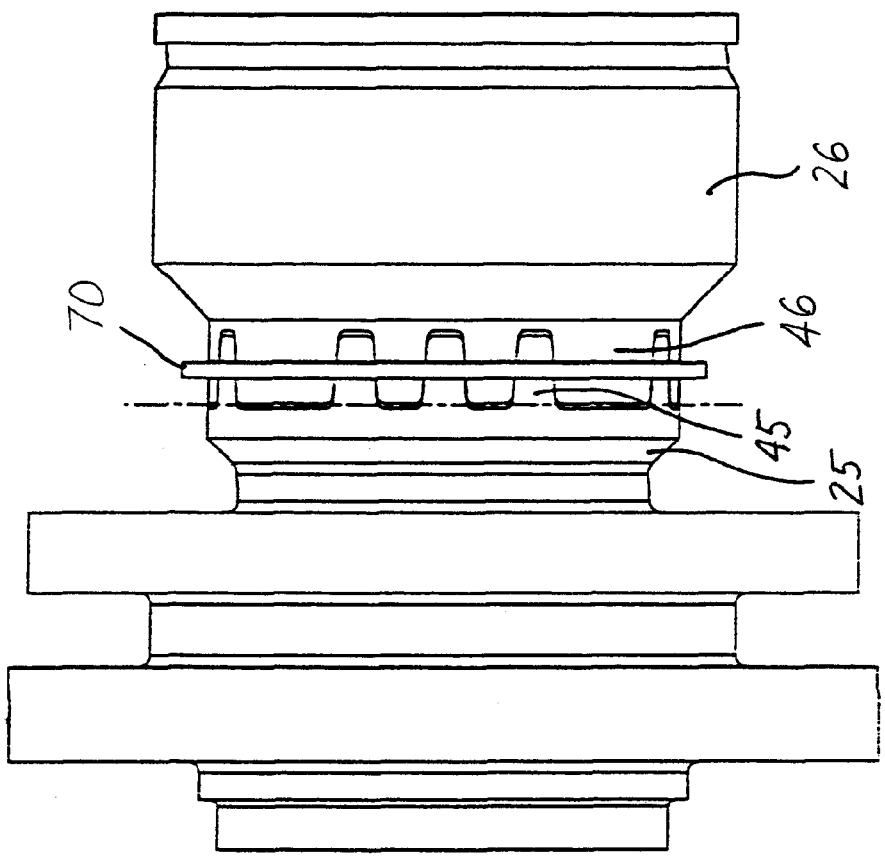
FIG. 14 shows a radial view of an end toothing with a deviating tooth shape.

FIG. 14 shows two inventive components 25, 26 with inter-engaging end toothings 45, 46 whose teeth comprise tooth flanks which, in a radial view, form angles which are of identical size and open in opposite directions. The end faces of the end toothings 45, 46 are arranged at a short axial distance from the other component of the connection. A securing ring 70 inserted into the circumferential grooves (not shown) secures the connection.

From the foregoing, it can be seen that there has been brought to the art a new and improved connecting assembly. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A connecting assembly comprising:
    a first component having an end toothing and a second component having an end toothing, wherein the end toothings each comprise teeth and gaps which are axially inserted into one another and circumferentially engage one another in a clearance-free way and wherein the teeth of the respective end toothings on an outer circumference each comprise outwardly opening circumferential grooves which are delimited by two flanks and which, when the respective end toothings are inserted into one another, together, form a circumferentially extending annular groove in which there is positioned a securing ring on the outside, and wherein the teeth at the first component and the second component, are each positioned within a cylindrical annular space and the gaps are positioned in pairs within two groups of continuous groove tracks which extend at a right angle relative to one another and which each pass through the respective cylindrical annular space twice, and wherein,
    in an end view, images of the teeth and gaps are the same at the first component and the second component, and wherein, starting from the corresponding images of the teeth and gaps at the first and second components, there are obtained matching complementary images at the teeth and gaps at the first and second components in an end view when the components are rotated relative to one another by 90° or 180°.

2. A connecting assembly comprising:
    a first component having an end toothing and a second component having an end toothing, wherein the end toothings each comprise teeth and gaps which are axially inserted into one another and circumferentially engage one another in a clearance-free way and wherein the teeth of the respective end toothings on an outer circumference each comprise outwardly opening circumferential grooves which are delimited by two flanks and which, when the respective end toothings are inserted into one another, together, form a circumferentially extending annular groove in which there is positioned a securing ring on the outside, and wherein the teeth at the first component and the second component, are each positioned within a cylindrical annular space and the gaps are positioned in pairs within two groups of continuous groove tracks which extend at a right angle relative to one another and which each pass through the respective cylindrical annular space twice, and wherein,
    at the cylindrical annular space, a ratio of an inner diameter (d) to an outer diameter (D) is defined by $d\sqrt{2} \geq D$, and wherein, a number (z) of teeth and gaps and a width (t) of the teeth and of the gaps is defined by $t = \sqrt{2}(D/2z)$.

3. A connecting assembly comprising:
    a first component having an end toothing and a second component having an end toothing, wherein the end toothings each comprise teeth and gaps which are axially inserted into one another and circumferentially engage one another in a clearance-free way and wherein the teeth of the respective end toothings on an outer circumference each comprise outwardly opening circumferential grooves which are delimited by two flanks and which, when the respective end toothings are inserted into one another, together, form a circumferentially extending annular groove in which there is positioned a securing ring on the outside, and wherein the teeth at the first component and the second component, are each positioned within a cylindrical annular space and the gaps are positioned in pairs within two groups of continuous groove tracks which extend at a right angle relative to one another and which each pass through the respective cylindrical annular space twice, and wherein, in an axial view, an image of the teeth and gaps comprises:

a first axis of symmetry (80) which extends through a central axis of the cylindrical space and intersects two of said teeth (82, 89) positioned opposite one another in pairs; and a second axis of symmetry (100) which extends perpendicularly relative to the first axis of symmetry (80) through said central axis and which intersects two of said gaps (122, 129) positioned opposite one another in pairs.

4. A connecting assembly comprising:

a first component having an end toothing and a second component having an end toothing, wherein the end toothings each comprise teeth and gaps which are axially inserted into one another and circumferentially engage one another in a clearance-free way and wherein the teeth of the respective end toothings on an outer circumference each comprise outwardly opening circumferential grooves which are delimited by two flanks and which, when the respective end toothings are inserted into one another, together, form a circumferentially extending annular groove in which there is positioned a securing ring on the outside, and wherein the teeth at the first component and the second component, are each positioned within a cylindrical annular space and the gaps are positioned in pairs within two groups of continuous groove tracks which extend at a right angle relative to one another and which each pass through the respective cylindrical annular space twice, and wherein, in an axial view, an image of the teeth and gaps comprises a first axis of symmetry (80) which extends through a central axis of the cylindrical space and on which at least two of said teeth (81, 89) positioned opposite one another are mirrored on two identically shaped gaps (133, 126) positioned opposite one another;

a second axis of symmetry (100) which extends perpendicularly relative to the first axis of symmetry (80) through said central plane and on which at least two of said teeth (86, 92) positioned opposite one another can be mirrored on two identically shaped gaps (121, 129) positioned opposite one another; and a third axis of symmetry (140) which extends through one of said teeth (91) and one of said gaps (134) positioned radially opposite one another, and which halves an angle between the first and the second axis of symmetry (80, 100) and on which teeth are mirrored on identically shaped teeth and gaps are mirrored on identically shaped gaps.

5. A connecting assembly according to any one of claims 1 to 4, wherein the second component is connected to a wheel hub or forms an integral part of the wheel hub.

6. A connecting assembly according to any one of claims 1 to 4, wherein the second component is a shaft flange of a differential drive journal or of a connecting shaft.

7. A connecting assembly according to any one of claims 1 to 4, wherein the groove tracks of each group which contain the gaps are arranged symmetrically relative to a radial plane (80, 100) extending through a longitudinal axis of the first and second components.

8. A connecting assembly according to claim 7, wherein the gaps are positioned in pairs in a first group of two or four groove tracks and in a second group of three or five groove tracks extending at a right angle relative thereto.

9. A connecting assembly according to any one of claims 1 to 4, wherein the groove tracks of each group which contain pairs of the gaps (121, 122, 125–130, 132–134) are arranged asymmetrically relative to a radial plane (80, 100) extending through a longitudinal axis of the first and second components.

10. A connecting assembly according to claim 9, wherein the gaps (121, 122, 125–130, 132–134) are positioned in pairs in two groups of three or five groove tracks extending at right angles relative to one another.

11. A connecting assembly according to any one of claims 1 to 4, wherein the teeth of the respective end toothings comprise flanks which extend parallel to respective reference radial planes (80, 100).

12. A connecting assembly according to any one of claims 1 to 4, wherein the teeth of the respective end toothings comprise flanks which intersect respective reference radial planes (80, 100) at an angle, and wherein the angles of the flanks of each tooth open in opposite directions and are of identical size.

13. A connecting assembly according to any one of claims 1 to 4, wherein the circumferential grooves (47, 48) in the teeth of the respective end toothings and the securing ring (50) comprise flanks (51, 52) which extend parallel relative to one another and are positioned in axis-normal radial planes.

14. A connecting assembly according to any one of claims 1 to 4, wherein the circumferential grooves (63, 64) in the teeth of the respective end toothings and the securing ring (70) comprise flanks (71, 72) which, relative to an axis-normal radial plane, enclose an angle which opens radially outwardly.

15. A connecting assembly according to claim 13 wherein the securing ring (50) engages the circumferential grooves (47, 48) with both flanks in a clearance-free way.

16. A connecting assembly according to claim 14, wherein the securing ring (70) engages the circumferential grooves (63, 64) with both flanks in a clearance-free way.

17. A connecting assembly according to claim 13 wherein the circumferential groove (47) in the teeth of the first component end toothing (45) are axially offset relative to the circumferential groove (48) in the teeth of the second component end toothing (46) in such a way that the flanks (51, 52) of the securing ring (50) are in contact only with those flanks of the circumferential groove which faces the respective other end toothing.

18. A connecting assembly according to claim 14, wherein the circumferential groove (63) in the teeth of the first component end toothing (45) are axially offset relative to the circumferential groove (64) in the teeth of the second component end toothing (46) in such a way that the flanks (71, 72) of the securing ring (70) are in contact only with those flanks of the circumferential groove which faces the respective other end toothing.

* * * * *